United States Patent [19]

Cohen et al.

[11] 4,177,242

[45] Dec. 4, 1979

[54] METHOD OF OBTAINING PURE ALUMINA BY ACID ATTACK ON ALUMINOUS MINERALS CONTAINING OTHER ELEMENTS

[75] Inventors: Joseph Cohen; Alain Adjemian, both of Aix en Provence, France

[73] Assignee: Aluminum Pechiney, Lyon, France

[21] Appl. No.: 876,205

[22] Filed: Feb. 9, 1978

[30] Foreign Application Priority Data

Feb. 28, 1977 [FR] France .............................. 77 06531

[51] Int. Cl.² .................. C01F 7/20; C01G 15/00; C22B 21/00
[52] U.S. Cl. ............................... 423/83; 423/126; 423/128; 423/132
[58] Field of Search ............... 423/126, 128, 131, 132, 423/467, 556, 626, 542, 83

[56] References Cited

U.S. PATENT DOCUMENTS

| | | | |
|---|---|---|---|
| 1,734,196 | 11/1929 | Blumenberg, Jr. | 423/467 |
| 2,381,477 | 8/1945 | Waltman | 423/131 |
| 2,476,979 | 7/1949 | Hueman | 423/132 |
| 3,620,671 | 11/1971 | Maurel et al. | 423/128 |
| 3,862,293 | 1/1975 | Maurel et al. | 423/128 |
| 3,894,144 | 7/1975 | Becher et al. | 423/467 |
| 4,069,299 | 1/1978 | Hodgson | 423/556 |

FOREIGN PATENT DOCUMENTS

574983 4/1924 France ..................................... 423/132
883311 11/1961 United Kingdom ..................... 423/128

Primary Examiner—O. R. Vertiz
Assistant Examiner—Gary P. Straub
Attorney, Agent, or Firm—McDougall, Hersh & Scott

[57] ABSTRACT

A method of obtaining alumina of high purity from aluminous mineral containing impurities by attacking the mineral with a sulphuric acid liquor and separating the resulting liquor from a residue which remains after the attack, the steps of (a) mixing the resulting liquor with a liquor containing HCl and $H_2SO_4$,
(b) introducing HCl gas into the mixture,
(c) cooling the mixture from step (b) to precipitate hydrated aluminum chlorosulphate crystals having the formula $AlSO_4Cl.6\text{-}7H_2O$,
(d) separating the hydrated crystals of hydrated aluminum chlorosulphate from the mother liquor,
(e) heating the separated crystals to a temperature that does not exceed 600° C. to yield a mixture of aluminum sulphates and hydrochloric gases,
(f) thermally decomposing the aluminum sulphates to yield alumina of high purity and sulphuric gases,
(g) degassing the mother liquor of step (c) to yield HCl gas,
(h) concentrating the mother liquor from step (f),
(i) freeing the concentrate from impurities, and
(j) recycling the mother liquor from step (h) to the attack on the aluminous mineral.

17 Claims, 2 Drawing Figures

METHOD OF OBTAINING PURE ALUMINA BY ACID ATTACK ON ALUMINOUS MINERALS CONTAINING OTHER ELEMENTS

This invention relates to a method of obtaining alumina of high purity by sulphuric acid attack on aluminous minerals containing impurities, followed by chlorosulphonic treatment of the product resulting from attack, precipitation of a hydrated aluminum chlorosulphate, then its conversion by pyrohydrolysis into hydrated aluminum sulphates which are subsequently decomposed by heating to provide the alumina of high purity.

The invention also relates to the recovery of certain elements contained in the mineral in an appreciable amount, such as iron, titanium and alkaline and alkaline-earth metals, with a view toward making use of them.

It was proposed many years ago to attack aluminous minerals with sulphuric acid so as to extract pure alumina therefrom. Thus, for example, the Asseev French Pat. No. 574,983 proposes attacking an aluminous mineral with sulphuric acid, treating the resultant solution with hydrochloric acid and thermally decomposing the hexahydrated aluminum chloride thus formed. However, the patent gave no details regarding the means to be employed for eliminating impurities that accompany aluminum in minerals, which impurities can differ very greatly from one mineral to another. Furthermore, the method disclosed by this patent did not enable a pure alumina to be obtained on a cyclic basis.

Other more recent publications, such as French patent specification Nos. 1,558,347 and 2,160,743 proposed cyclic sulphuric acid attack methods and described means for eliminating certain impurities and for obtaining a pure alumina of the required metallurgical quality. However, to achieve this result, the acid aluminum sulphate solution which also contained iron, magnesium, alkaline metals, etc., as impurities, was diluted with water or with a hydrochloric solution, cooled to a suitable temperature and saturated with hydrochloric gas so as to cause precipitation of hexahydrated aluminum chloride. The latter, separated from its mother liquor, was then subjected to purification by dissolution and precipitation by saturation of the liquors with gaseous hydrochloric acid, which operation could be repeated several times.

Although these cyclic methods offer several advantages including those of producing a pure alumina, continuing their researches in this field, applicants have tried to develop a new method which would be more economical in the use of hydrochloric acid, while providing a very pure alumina having the required metallurgical qualities. Interestingly, it has been found that it is possible to treat a sulphuric solution, resulting from attacking an aluminous mineral, at atmospheric pressure, with a chlorosulphonic solution at a temperature lower than but near to boiling temperature, without incurring any losses due to the release of hydrochloric acid vapors.

In its essentials, the method embodying the features of the invention comprises the following steps:

attack on the aluminous mineral, also containing other constituents such as iron and titanium, with an aqueous sulphuric solution containing, by weight, between 40 and 60% of free sulphuric acid and between 6 and 12% of the various metals forming the impurities in the treated material, such as obtained by recycling this solution, and leading to a solution, after attack, that is rich in dissolved aluminum sulphate, which may have a concentration of as high as 12% by weight of $Al_2O_3$. The suspension, resulting from attack, is held at a temperature lower than boiling temperature during the operation, the duration of which is between half an hour and five hours, separation of the residue resulting from attack in which the residue consists of unattacked oxides, mainly silica, insoluble sulphates, and an alumina-rich sulphuric liquor, washing of the residue resulting from attack so as to extract therefrom the impregnation mother liquors, as by means of a suitable quantity of recycling sulphuric acid still containing a very small quantity of alumina which is associated with the alumina-rich sulphuric liquor, then, treatment of the residue resulting from attack with a weak sulphuric liquor to cause dissolution of the insoluble sulphates and allowing separation of inert substances from the liquor in which the sulphates of the impurities are dissolved and which will be treated to obtain the useful components therefrom, mixing of the alumina-rich sulphuric liquor with a recycling chlorosulphonic liquor (HCl and $H_2SO_4$) as well as with recycling gaseous HCl, cooling of the liquor containing HCl and $H_2SO_4$ obtained, which contains alumina and the solubilized impurities, until a hydrated aluminum chlorosulphate having the formula $AlSO_4Cl.6\text{-}7H_2O$ is precipitated, separation of the hydrated aluminum chlorosulphate crystals impregnated with mother liquors, from a liquor of HCl and $H_2SO_4$ containing the major part of the impurities, washing of the hydrated aluminum chlorosulphate crystals with a recycling hydrochloric acid solution, followed by separation of said crystals from the impregnation liquor entrained by the hydrochloric solution, thermal decomposition, in a first stage, of the aluminum chlorosulphate to form aluminum sulphate, and recycling of the gaseous HCl effluents and water, thermal decomposition, in a second stage, of the aluminum sulphates to form $Al_2O_3$, and recycling of the gaseous effluents formed by a mixture of $SO_2$ and $SO_3$ and $H_2O$, mixing of the liquor in which the sulphates of the impurities are dissolved with a concentrated solution of recycled sulphuric acid, causing precipitation of the sulphates of the impurities, separation of the sulphates of the impurities and of the sulphuric liquor, the latter of which is added, after concentration, to the liquor containing HCl and $H_2SO_4$ resulting from the separation of the aluminum chlorosulphate, thermal decomposition of the sulphates of the impurities to obtain oxides of iron and titanium and a gaseous mixture of $SO_2$, $SO_3$ and water, and degassing of the mixture formed by the liquor containing HCl and $H_2SO_4$ and the sulphuric liquor resulting from the separation of the sulphates of the impurities, and recycling it to the attack.

The solution used for attacking the aluminous minerals is constituted of recycled aqueous solutions containing free sulphuric acid, the quantity of which has been adjusted by an addition from an outside source in an amount to compensate losses, as well as various metallic sulphates in a small amount which, for each sulphate, is a function of its solubility in such acid solutions.

The attack on the aluminous mineral takes place hot at a temperature lower than but near to boiling point, at atmospheric pressure and during a period which may vary between half an hour and five hours.

After the sulphuric attack on the aluminous mineral, the product of attack, which consists of a liquid phase, containing the soluble aluminum sulphates, and of a solid phase, constituted by inert substances and the insoluble sulphates of the impurities, is separated into these two phases. The liquid phase is then treated hot at atmospheric pressure with a solution containing HCl and $H_2SO_4$ consisting for example of the recycled solution obtained from the last washing of the hydrated aluminum chlorosulphate after its separation from the mother liquor, as well as with an added hydrochloric acid solution, compensating losses in the cycle, and with recycled hydrochloric gas resulting from a degassing operation.

The solution containing HCl and $H_2SO_4$ is then cooled, while being stirred in a controlled manner, to a temperature of approximately 40° C. in the presence of crystals obtained from a previous operation, the time necessary for crystallization being at most in the order of five hours. The main part of the alumina contained in the attack solution is precipitated in the form of hydrated aluminum chlorosulphate having the formula $AlSO_4Cl.6$ or $7H_2O$, whereas the impurities remain in the dissolved state in the liquor containing HCl and $H_2SO_4$ (chlorosulphonic liquor).

In a modified form of the method, and after separation and washing of the cake with a recycling hydrochloric solution, the hydrated aluminum chlorosulphate crystals can be extracted from the production cycle with a view to their being used in this form. In such instance, equivalent quantities of sulphuric acid and hydrochloric acid are introduced into the cycle in the form of solutions so as to make up for the corresponding losses.

In the more general case, the hydrated aluminum chlorosulphate crystals are thermally treated at a temperature of at most 600° C. but preferably 300° C. and 400° C., to yield a mixture of sulphates and gaseous effluents consisting of water vapor and gaseous HCl which are subsequently washed and absorbed.

In another modified form of the method, the mixture of aluminum sulphates, consisting mainly of basic sulphate, having the formula $3Al_2O_3$, $4SO_3$, $O-2H_2O$ and containing also neutral sulphate $Al_2(SO_4)_3$, the average composition of which is represented by the formula $Al_2O_3$, $2SO_3$, may be extracted from the production cycle in these two forms which may be later separated from each other by means known to the person skilled in the art. In such instance, equivalent quantities of sulphuric acid are introduced into the cycle in the form of a solution to make up for the corresponding losses.

In the more general case, the mixture of basic and neutral aluminum sulphates in the warm condition is raised to a temperature of 1050° C., thus causing decomposition of the sulphates so as to yield pure alumina and a gaseous mixture consisting of $SO_2$, $SO_3$ and $H_2O$ which is converted into $H_2SO_4$.

The mother liquor resulting from separation of the aluminum chlorosulphate crystals and which may contain titanium, iron, etc. impurities in the dissolved state, is degassed by heating, the separated gaseous hydrochloric acid is recycled, and the sulphuric liquor obtained is then concentrated by evaporation to eliminate water. Thereafter the iron, titanium, etc. impurities can be precipitated in the form of sulphates or even of double sulphates as described in French patent application No. 75,32,026 in the name of the present applicants. The sulphuric liquor is then recycled to the attack. A fraction of this sulphuric liquor can be used for washing the residue resulting from attack.

As already stated, the residue resulting from attack, consisting of inert substances and insoluble sulphates of the impurities, is treated with a weak sulphuric acid liquor resulting from dissolving said sulphates. There is then added to this liquor, concentrated sulphuric acid, which thus causes precipitation of the sulphates of the impurities, which are separated and subsequently decomposed to yield corresponding oxides as well as a gaseous mixture which consist of $SO_2$, $SO_3$ and water vapors which are reconverted into sulphuric acid.

The method of the invention is a cyclic one which permits the isolation of a pure alumina and a mixture of complex salts mainly containing iron and titanium as well as the other impurities. The consumption of reagents is low and is concerned only with replacing losses of sulphuric acid and hydrochloric acid, which losses mainly stem from mechanical causes.

The method of the invention is applicable to the treatment of natural or synthetic aluminous materials containing impurities; such substances include silico-aluminous minerals such as kaolins, siliceous bauxites, kaolinic clays, shales which may contain coal, or impure aluminas or aluminum sulphates resulting from primary processing.

The invention will be illustrated by referring to the attached Figures in which.

Figure 1:
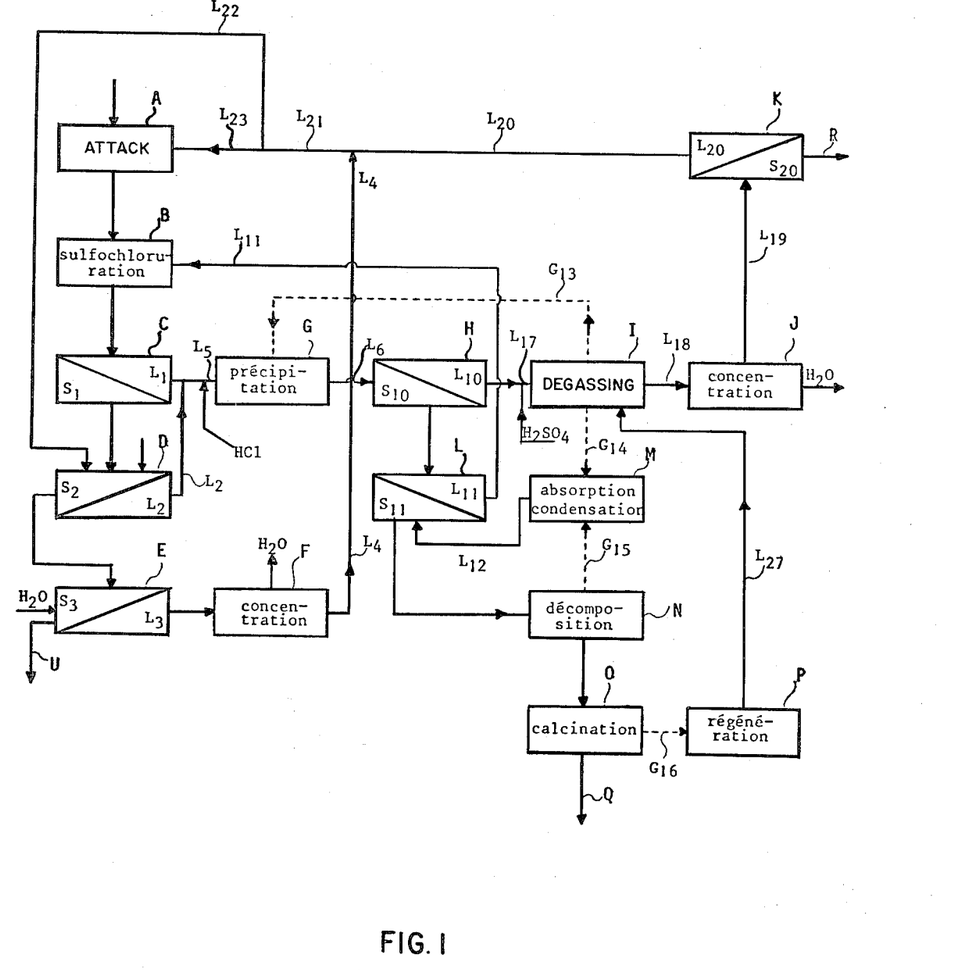
FIGS. 1 and 2 are flow diagrams representative of the practice of this invention.

Referring to FIG. 1, the aluminous mineral and the recycled sulphuric attack liquor L23 are introduced into the attack reaction vessel (A). The slurry obtained after attack is treated at (B) by a recycled chlorosulphonic liquor L11 (a liquor containing HCl and $H_2SO_4$), then, at (C), a cake S1 and an alumina-rich liquor L1 containing certain solubilized impurities are separated. The mother liquors of the cake S1 are extracted at (D) by means of a fraction L22 of the sulphuric acid liquor intended for attacking the mineral. The mother liquors L2, thus extracted, are mixed with the liquor L1 to obtain the liquor L5 following a possible addition of HCl. The resultant cake S2 is then washed with water at (E) to give an inert residue, which is extracted at (U) and consists mainly of silica, and a liquor L3 which is concentrated at (F) by evaporation of part of its water. The sulphuric liquor L4 obtained is returned to the attack (A).

The liquor L5 is formed by mixture of the liquors L1 and L2 and a hydrochloric solution introduced to make up the losses. The mixture thus obtained is passed to (G) where gaseous HCl G13, obtained from the degassing operation (I), is introduced and, at the same time, the mixture is cooled to 40° C. while stirring in the presence of inoculants. In this way, hydrated aluminum chlorosulphate, having the composition $AlSO_4Cl.6$ or $7H_2O$ is precipitated.

The chlorosulphate crystals S10 are separated at (H), whereas the mother liquors L10, containing in solution impurities such as iron, titanium, etc., are passed to (I).

The crystals S10 are then transferred to (L) where rinsing is carried out with a hydrochloric acid solution L12 resulting from the condensation-absorption operation (M). In this way, crystals S11, free from mother liquor L10, are obtained, whereas this liquor, entrained by L12, forms the chlorosulphonic liquor L11 containing a small quantity of impurities and used at (B).

The pure crystals of hydrated aluminum chlorosulphate S11, impregnated with the rinsing liquor, are carried to (N) where a thermal treatment at between 300° C. and 400° C. is carried out, causing thermal decomposition of the hydrated aluminum chlorosulphate to give a mixture of aluminum sulphates and gaseous effluents G15 consisting of water vapor and HCl to be absorbed at (M).

The solid product, obtained from this first thermal decomposition and constituted by a mixture of basic and neutral aluminum sulphates, is passed to (O) where calcination at 1050° C. is carried out to provide a pure alumina, collected at (Q), and a gaseous mixture consisting of $SO_2$, $SO_3$ and $H_2O$, converted at (P) into $H_2SO_4$, forming the sulphuric acid solution L27 which is passed to (I).

The liquor L17, containing HCl and $H_2SO_4$ constituted by the mixture consisting of the liquor L10 and an $H_2SO_4$ addition, is introduced into (I) where degassing is carried out to give a practically sulphuric liquor L18, still containing impurities and gaseous HCl, which is passed to (G) and (M) by way of the lines G13 and G14.

The liquor L18, to which may have been added cations allowing of the formation of complex sulphates of iron and titanium, is passed to (J) where it is concentrated out by evaporating off water.

The suspension L19, issuing from (J), is made into a slurry comprising a solid phase, consisting of the complex sulphates of impurities that are to be eliminated, and a liquid phase which is a sulphuric liquor. The two phases are then separated at (K) into a cake S20, which is a mixture of complex sulphates of iron, titanium, etc. which can be put to commercial use, and into a liquor L20 which is recycled along the lines L21 and L23 to the attack (A), and along the lines L21 and L22 for washing inert substances at (B).

Figure 2:
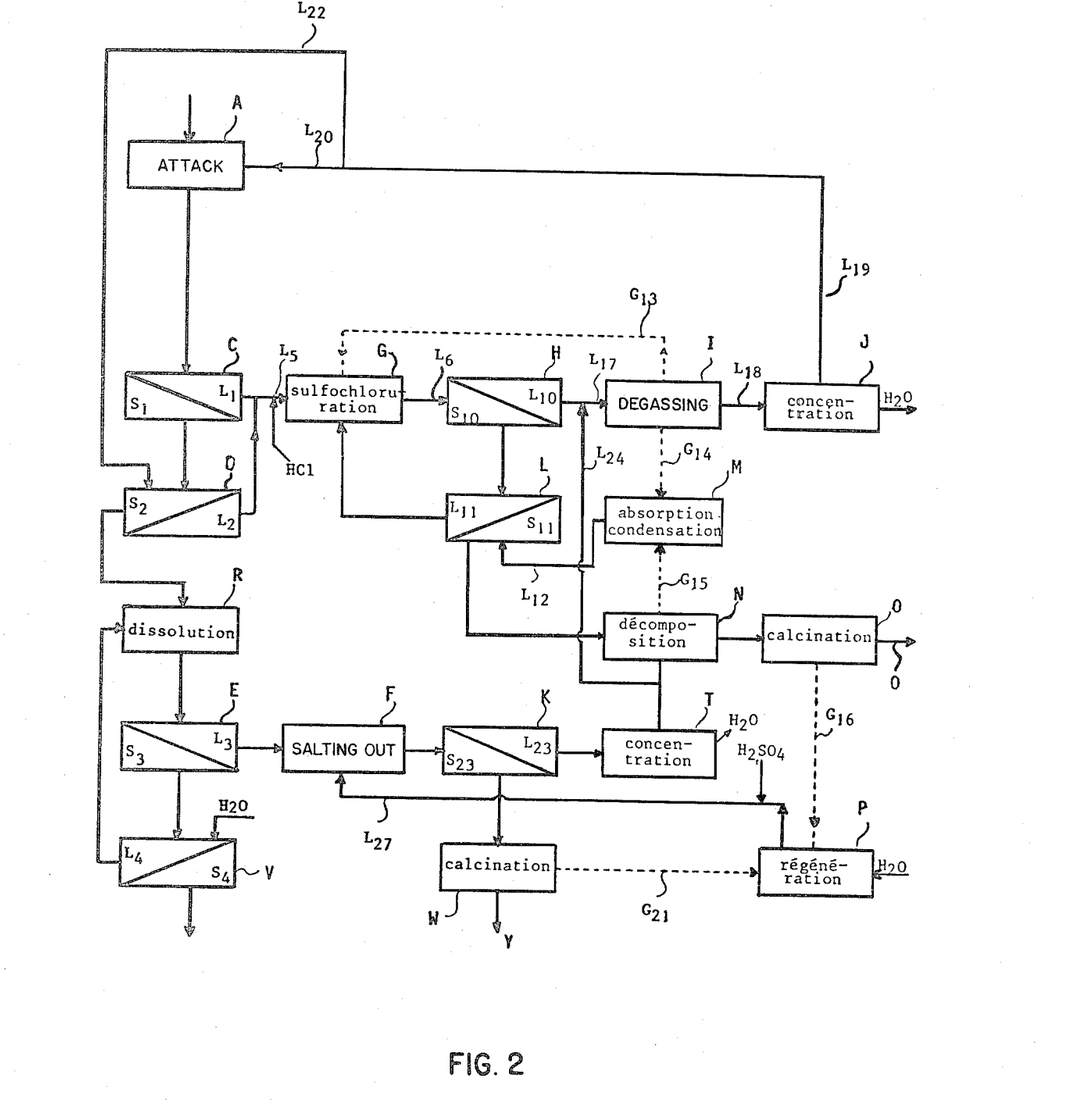

Referring to FIG. 2, the slurry resulting from attack at (A) is introduced into (C) where the cake S1 is separated from the liquor L1, containing alumina and certain solubilized impurities. The liquor L1 is then added to the liquor L2 to form the liquor L5, to which HCl may be added if losses resulting from the operation of the cyclic method have to be made up. The liquor L5 is then introduced into (G) where it is treated by the chlorosulphonic liquor L11 (liquor containing HCl and $H^2SO_4$) obtained from (L).

Since the pickup containing HCl and $H_2SO_4$ is carried out after separation of insoluble substances following attack, the cake S1 is constituted of inert substances and the insoluble sulphates of impurities in the liquor following attack as well as by the mother impregnation liquor. This mother liquor is passed to (D) through the line L22 to provide a cake S2 and a liquor L2 which is added to L1, as already stated.

The resultant cake S2 is then passed to (R) where the insoluble sulphates in the solution following attack are, for the most part, redissolved in the slightly sulphuric recycled liquor L4, resulting from the washing of the sterile substances.

The contents of (R) are then introduced into (E) where a liquor L3 is separated from a cake S3 which is washed with water at (V) to give an inert residue consisting mainly of silica and the above-mentioned liquor L4 recycled to (R) and used for redissolving certain constituents of S2.

The liquor L3, containing the redissolved sulphates of the impurities, is introduced into (F) where it is treated with a concentrated sulphuric acid liquor L27 obtained from (P). Thus, precipitation of the impurities as their corresponding sulphates is caused to take place in (F), the contents of which are passed to (K) where sulphates of impurities S23 and a mother liquor L23 are separated.

The sulphates of the impurities S23 are then calcinated at (W) to provide the oxides of the impurities, such as iron and titanium oxides and a gaseous mixture G21 consisting of $H_2O$, $SO_2$ and $SO_3$, which is passed to (P) to enable $H_2SO_4$ to be regenerated.

The liquor L23, issuing from (K), is introduced into (T) and is then concentrated, water being eliminated and a liquor L24 being produced that has a higher $H_2SO_4$ concentration, is recycled upstream of (I) and is mixed with the liquor L10.

The liquor L27 results from regeneration at (P), and $H_2SO_4$ may be added thereto to make up any losses occurring in the circuit as a whole.

As already stated, the liquor L5, constituted by mixing the liquors L1 and L2 and a possible HCl addition compensating the losses in the cycle, is introduced into (G) where it undergoes chlorosulphonization by the simultaneous addition of gaseous HCl resulting from the degassing at (I) and a liquor L containing HCl and $H_2SO_4$ resulting from separation at (L). Then, while the mixture is being stirred, the temperature of the medium is reduced to approximately 40° C., for example, in the presence of inoculants to promote precipitation of hydrated aluminum chlorosulphate having the formula $AlSO_4Cl \cdot 6\text{-}7H_2O$.

The chlorosulphate crystals S10 are separated, whereas the mother liquors L10 are passed to (I) to be degassed.

The crystals S10 are introduced into (L) where rinsing is carried out with a hydrochloric solution resulting from the absorption and condensation step at (M). Thus chlorosulphate crystals S11, freed from their mother liquor L10, are obtained and this liquor, entrained by L12, forms the liquor L11 containing HCl and $H_2SO_4$ used at (G).

The pure hydrated aluminum chlorosulphate crystals S11, impregnated with the rinsing liquor, are carried to (N) where thermal treatment at between 300° C. and 400° C. is carried out to cause decomposition of the hydrated chlorosulphate to give a mixture of aluminum sulphates and gaseous effluents G15 consisting of water vapor and HCl which are absorbed at (M).

The solid fraction issuing from (N) consists of a mixture of basic and neutral aluminum sulphates and is introduced into (O) where calcination is carried out at 1050° C. to give a pure alumina which is collected at (Q), and a gaseous effluent consisting of a mixture of $SO_2$, $SO_3$ and $H_2O$ which undergoes regeneration at (P) to yield $H_2SO_4$, which forms the sulphuric solution L25 fed to (T) through the line L26 and to (F) through the line L27.

The liquor L17, containing HCl and $H_2SO_4$ formed by the mixture of the liquors L10 and L24, is introduced into (I) where degassing is carried out to provide a practically sulphuric liquor L18 and gaseous HCl which is piped to (G) and (M) through the lines G13 and G14.

The liquor L18 is then passed to (J) where it is concentrated by evaporating off water.

The concentrated liquor L19, issuing from (J), is directly recycled to the attack (A) through the line L20 and to (D) for rinsing the inert substances and the sulphates of impurities, through the line L22.

EXAMPLE 1

(Illustrated by FIG. 1)

A kaolin having the following composition in percent by weight was treated by the method of the invention:

| | |
|---|---|
| $Al_2O_3$ | 28.23% |
| $Fe_2O_3$ | 0.79% |
| $TiO_2$ | 1.81% |
| $SiO_2$ and various | 39.92% |
| $H_2O$ of impregnation and component of the mineral | 29.25% |

4,034 kg of this mineral were put at (A) into 8,943 kg of a hot sulphuric attack solution containing by weight:

| | |
|---|---|
| $H_2SO_4$ total | 65.22% |
| $H_2SO_4$ free | 53.99% |
| $Al_2O_3$ (in the form of sulphate) | 0.87% |
| $TiO_2$ (in the form of sulphate) | 0.06% |
| $NH_3$ (in the form of sulphate) | 2.99% |
| $H_2O$ | 30.86% |

The slurry obtained after attack was transferred from one vessel to another and then treated at (B) with 7,380 kg of a liquor L11 containing HCl and $H_2SO_4$ containing by weight:

| | |
|---|---|
| $Al_2O_3$ | 0.47% |
| $Fe_2O_3$ | 0.12% |
| $TiO_2$ | 0.05% |
| $NH_3$ | 1.45% |
| $H_2SO_4$ total | 22.56% |
| HCL | 20.08% |
| $H_2O$ | 55.27% |

The slurry containing HCl and $H_2SO_4$, which was at a temperature of 80° C.–90° C., was then piped to (C) where the solid phase S1 was separated from the liquid phase L1 containing alumina and certain solubilized impurities.

The cake S1 was then rinsed at (D) with 5,000 kg of a liquor L22 originating from the same source as the liquor L23 that had been used for the attack.

The mother liquors from S1 and included in S2 were thus extracted and united with the liquor L1 containing HCl and $H_2SO_4$ issuing from (C).

The cake S2 was introduced into (E) where it was washed with water to provide a liquor L3, having a mass of 4,722.20 kg, and an inert residue S3, the dry weight of which was 1,996 kg and the residual liquor of which, representing the washing loss, weighed 277.80 kg.

The residue S3 had the following composition by weight:

| | |
|---|---|
| $Al_2O_3$ | 5.71% |
| $Fe_2O_3$ | 0.30% |
| $TiO_2$ | 3.30% |
| $SiO_2$ and various | 90.69% |

The liquor L3 was then introduced into (F) where it was concentrated by evaporation to remove 1,500 kg of water to give 3,222 kg of a liquor L4 recycled to the attack on the mineral and having the following composition by weight:

| | |
|---|---|
| $Al_2O_3$ | 0.87% |
| $TiO_2$ | 0.06% |
| $NH_3$ | 3.01% |
| $H_2SO_4$ total | 65.24% |
| $H_2O$ | 30.82% |

The liquor, formed by the mixture of L1 and L2 and which had a weight of 19,859 kg, to which was added 27 kg of HCl at a concentration of 37% to make up the losses in the circuit, was introduced into (G) where, while gaseous HCl was being introduced, cooling was carried out to approximately 40° C. with agitation and in the presence of an inoculant which promotes precipitation of hydrated aluminum chlorosulphate.

After precipitation, the suspension of aluminum chlorosulphate crystals in the mother liquors was transferred from one vessel to another at (H) where a cake S10 having a dry weight of 5,636 kg was separated off from a mother liquor L10 containing in solution impurities, such as iron and titanium and having a weight of 10,993 kg.

The crystals of S10 were rinsed at (L) with 6,038 kg of a recycled hydrochloric liquor L12 having a concentration of 32% and resulting from the absorption condensation at (M).

After rinsing, 7,380 kg of a liquor L11 recycled at (B) were obtained, this liquor having the above-mentioned composition, and 8,051 kg of impregnated crystals, forming a cake S11, were also obtained.

The cake S11 in the dry state had the following composition by weight:

| | |
|---|---|
| $Al_2O_3$ | 17.92% |
| $H_2SO_4$ | 34.43% |
| HCL | 12.82% |
| $H_2O$ of constitution | 34.83% |

Transferred from one vessel to another at (N), the crystals forming the cake S11 were subjected to a thermal treatment between 300° C. and 400° C., causing decomposition of the hydrated aluminum chlorosulphate into a mixture of aluminum sulphates and 5,592 kg of gaseous effluents G15 consisting of water vapor and HCl which were absorbed at (M).

The mixture of aluminum sulphates, having a mass of 2,589 kg was calcinated at (O) at a temperature of 1050° C. to yield 1,000 kg of pure $Al_2O_3$ and 2,019 kg of a gaseous mixture G16 constituted of water vapor, $SO_2$ and $SO_3$, but a loss of 20 kg was recorded, during calcination and introduction of 450 kg of water with the fuel.

The gaseous mixture G16 was then piped to (P) where regeneration of the sulphuric acid took place. L27, representing the quantity of $H_2SO_4$ at 95% introduced into the degassing zone (I), was drawn off from the regeneration zone (P).

362 kg of recycled 95.8% $H_2SO_4$ were added to the mother liquor L10 which had a mass of 10,993 kg. Also added to this mother liquor were 84 kg of $(NH_4)_2SO_4$ whereby it was later possible to eliminate the impurities present by using the treatment described in French patent application No. 75.32,026 filed Oct. 20, 1975 in the name of the present applicants.

Thus, the mixture of L10, $H_2SO_4$ and $(NH_4)_2SO_4$ formed the mother liquor L17 entering the degassing reaction vessel (I); the liquor L17 had a mass of 11,438 kg and the following composition by weight:

| | |
|---|---|
| Al₂O₃ | 0.90% |
| Fe₂O₃ | 0.23% |
| TiO₂ | 0.10% |
| NH₃ | 2.93% |
| H₂SO₄ total | 46.16% |
| HCL | 8.27% |
| H₂O | 41.41% |

This liquor L17 was introduced into (I) where degassing was carried out to give the gaseous fractions G13 and G14 representing 946 kg of HCl piped to (G) and (M), and 12,513 kg of a practically sulphuric liquor L18 having the following composition by weight:

| | |
|---|---|
| Al₂O₃ | 0.82% |
| Fe₂O₃ | 0.21% |
| TiO₂ | 0.09% |
| NH₃ | 2.68% |
| H₂SO₄ free | 47.05% |
| H₂SO₄ total | 57.63% |
| H₂O | 38.57% |

The liquor L18 was moved to (J) where concentration was carried out by evaporating off 1,469 kg of water, and a mass L19 of 11,043 kg was produced, this being constituted by a solid phase dispersed in a liquid phase introduced into (k). This fraction L19 provided 322 kg (in the dry state) of a cake S20, the constituents of which were eliminated at (R), and 10,721 kg of a sulphuric liquor L20, the major part of which was for recycling to the attack (A).

The cake S20 was formed of complex sulphates of impurities that were to be eliminated and which were precipitated during evaporation at (J) and had the following composition by weight:

| | |
|---|---|
| Al₂O₃ | 3.10% |
| Fe₂O₃ | 8.07% |
| TiO₂ | 2.17% |
| NH₃ | 4.04% |
| H₂SO₄ free | 29.50% |
| H₂SO₄ total | 68.01% |
| H₂O | 14.61% |

The liquor L20 was recycled along the line L23 to the attack and along the line L22 for washing out the inert substances at (D).

The analysis of the alumina obtained indicates that impurities are present in quantities lower than or equal to those of aluminas obtained by the large scale conventional industrial processes:

Fe < 200 p.p.m.
Si < 150 p.p.m.
Ti < 25 p.p.m.
Na < 800 p.p.m.

EXAMPLE 2

(Illustrated by FIG. 2)

A calcinated coal-heating shale having the following composition by weight was treated by the method of the invention:

| | |
|---|---|
| Al₂O₃ | 26.90% |
| Fe₂O₃ | 7.21% |
| TiO₂ | 1.01% |
| Na₂O | 0.25% |
| K₂O | 4.00% |
| MgO | 1.91% |
| P₂O₅ | 0.20% |
| V₂O₅ | 0.04% |
| CaO | 0.54% |
| SiO₂ and various | 56.72% |
| H₂O | 1.22% |

4,452 kg of this calcinated and crushed mineral were placed at (A) in 12,112 kg of a hot sulphuric attack liquor L20 containing by weight:

| | |
|---|---|
| Al₂O₃ (in the form of sulphate) | 0.87% |
| Fe₂O₃ (in the form of sulphate) | 0.10% |
| TiO₂ (in the form of sulphate) | 0.02% |
| Na₂O (in the form of sulphate) | 1.10% |
| K₂O (in the form of sulphate) | 0.80% |
| MgO (in the form of sulphate) | 0.75% |
| P₂O₅ | 0.20% |
| V₂O₅ | 0.08% |
| H₂SO₄ free | 51.80% |
| H₂SO₄ total | 58.97% |
| H₂O | 37.11% |

The slurry resulting from the attack at (A), having a temperature of 110° C. to 120° C., was piped to (C) where the solid phase S1 was separated from the liquid phase L1 containing alumina.

The cake S1 was rinsed at (D) with 8,942 kg of a fraction L22 of the sulphuric liquor which was to be used for the attack on the mineral and the composition of which has been given previously.

The mother liquors, contained in the cake S1, were thus extracted to provide the liquor L2, subsequently united with the liquor L1 emanating from (C).

Thereafter, the mixture of the liquors L1 and L2 had a weight of 15,048 kg which was introduced at (G) to undergo chlorosulphonization, after HCl had been added thereto.

The cake S2, that had undergone this first rinsing, was transferred to (R) where the sulphates of impurities, insoluble in the solution after attack, were solubilized in 8,530 kg of the weak sulphuric recycled liquor L4 resulting from washing out sterile substances at (V).

This liquor L4 had the following composition by weight:

| | |
|---|---|
| Al₂O₃ | 0.15% |
| Fe₂O₃ | 0.66% |
| TiO₂ | 0.01% |
| Na₂O | 0.15% |
| K₂O | 0.47% |
| MgO | 0.34% |
| P₂O₅ | 0.03% |
| V₂O₅ | 0.01% |
| H₂SO₄ free | 6.75% |
| H₂SO₄ total | 10.20% |
| H₂O and various | 87.98% |

The contents of (R) were then introduced into (E) where a liquor L3 and a cake S3 were separated off from each other.

The residue S3 had a mass of 5,554 kg which was passed to (V) for rinsing with 6,000 kg of water to give the above-mentioned liquor L4 and a cake S4 which, in the dry state weighed 2,888 kg and had the following composition by weight:

| | |
|---|---|
| $Al_2O_3$ | 5.40% |
| $Fe_2O_3$ | 0.90% |
| $TiO_2$ | 1.38% |
| $Na_2O$ | 0.03% |
| $K_2O$ | 0.41% |
| MgO | 0.73% |
| $P_2O_5$ | 0.21% |
| CaO | 0.83% |
| $H_2SO_4$ total | 1.38% |
| $H_2O$ and various | 3.84% |
| $SiO_2$ | 84.89% |

The liquor L3 issuing from (E) had a mass of 13,434 kg and the following composition by weight:

| | |
|---|---|
| $Al_2O_3$ | 0.50% |
| $Fe_2O_3$ | 2.22% |
| $TiO_2$ | 0.04% |
| $Na_2O$ | 0.48% |
| $K_2O$ | 1.58% |
| MgO | 1.17% |
| $P_2O_5$ | 0.11% |
| $V_2O_5$ | 0.04% |
| $H_2SO_4$ free | 22.75% |
| $H_2SO_4$ total | 34.37% |
| $H_2O$ and various | 59.49% |

This liquor was introduced into (F) where it was salted out after having been mixed with 3,695 kg of a sulphuric solution L27 having a concentration of 96%. The slurry issuing from (F) was then introduced into (K) where sulphates of impurities in the form of a cake S23 and a liquor L23 were separated off.

The cake S23, in the impregnated state, had a mass of 2,595 kg and the following composition by weight:

| | |
|---|---|
| $Al_2O_3$ | 1.19% |
| $Fe_2O_3$ | 11.25% |
| $TiO_2$ | 0.19% |
| $Na_2O$ | 0.38% |
| $K_2O$ | 6.32% |
| MgO | 2.39% |
| $P_2O_5$ | 0.12% |
| $V_2O_5$ | 0.08% |
| $H_2SO_4$ free | 17.38% |
| $H_2SO_4$ total | 58.53% |
| $H_2O$ etc. of impregnation | 19.55% |

The mass of sulphates of impurities, forming the cake S23, was passed to (W) where it was subjected to calcination at a temperature of between 1000° C. and 1050° C. to yield a solid phase, consisting mainly of oxides of impurities, and a gaseous phase G21 comprising water-vapor, $SO_2$ and $SO_3$, which phase was piped to (P) where $H_2SO_4$ was regenerated.

The liquor L23 issuing from (K), weighing 14,534 kg has the following composition by weight:

| | |
|---|---|
| $Al_2O_3$ | 0.25% |
| $Fe_2O_3$ | 0.04% |
| $TiO_2$ | 0.01% |
| $Na_2O$ | 0.38% |
| $K_2O$ | 0.33% |
| MgO | 0.65% |
| $P_2O_5$ | 0.08% |
| $V_2O_5$ | 0.02% |
| $H_2SO_4$ free | 42.33% |
| $H_2SO_4$ total | 45.72% |
| $H_2O$ | 52.52% |

The liquor mixture was then introduced into (T) to be concentrated by the elimination of 4,888 kg of water, this operation yielding 9,645 kg of a liquor L24 recycled between (H) and (I) to be united with L10.

The liquor L24 had the following composition by weight:

| | |
|---|---|
| $Al_2O_3$ | 0.38% |
| $Fe_2O_3$ | 0.06% |
| $TiO_2$ | 0.01% |
| $Na_2O$ | 0.57% |
| $K_2O$ | 0.50% |
| MgO | 0.98% |
| $P_2O_5$ | 0.12% |
| $V_2O_5$ | 0.03% |
| $H_2SO_4$ free | 63.79% |
| $H_2SO_4$ total | 68.89% |
| $H_2O$ | 28.46% |

The concentrated sulphuric liquor L27 was discharged from (P) and $H_2SO_4$ had been added to it to make up the losses in the production cycle.

As already stated, the liquor L5 was constituted by the mixture of the liquors L1 and L2 and a hydrochloric acid addition. This liquor L5 weighed 15,075 kg and had the following composition by weight:

| | |
|---|---|
| $Al_2O_3$ | 7.67% |
| $Fe_2O_3$ | 0.10% |
| $TiO_2$ | 0.01% |
| $Na_2O$ | 1.17% |
| $K_2O$ | 0.80% |
| MgO | 0.42% |
| $P_2O_5$ | 0.20% |
| $V_2O_5$ | 0.09% |
| $H_2SO_4$ free | 25.07% |
| $H_2SO_4$ total | 51.18% |
| HCl | 0.07% |
| $H_2O$ | 38.29% |

This mass, L5, which had a temperature of approximately 100° C., was then introduced into (G) where it underwent chlorosulphonization by the simultaneous introduction of 5,000 kg of gaseous HCl G13 and 7,380 kg of a liquor L11 containing HCl and $H_2SO_4$ which had the following composition by weight:

| | |
|---|---|
| $Al_2O_3$ | 0.54% |
| $Fe_2O_3$ | 0.05% |
| $Na_2O$ | 0.66% |
| $K_2O$ | 0.46% |
| MgO | 0.23% |
| $P_2O_5$ | 0.11% |
| $V_2O_5$ | 0.05% |
| $H_2SO_4$ total | 21.68% |
| HCl | 19.25% |
| $H_2O$ | 56.97% |

The mixture was continuously stirred and it was cooled to 40° C. in the presence of an inoculant which promoted precipitation of hydrated aluminum chlorosulphate having the formula $AlSO_4Cl.6-7H_2O$.

The slurry issuing from (G), weighing 22,955 kg, was introduced at (H) where 9,393 kg of hydrated aluminum chlorosulphate S10 and 13,562 kg of the mother liquor L10 were separated off.

The cake S10 was introduced into (L) where it underwent rinsing with 6,038 kg of a 32% HCl solution L12 emanating from the absorption zone (M). In this way there were obtained a cake S11 of pure chlorosulphate and the liquor L11 which has already been mentioned as regards to its use at (G).

The pure hydrated aluminum chlorosulphate crystals forming the cake S11 were introduced into (N) where thermal treatment was carried out between 300° C. and 400° C. to cause decomposition of the aluminum chlorosulphate and to yield gaseous effluents G15, weighing 5,592 kg, consisting of water-vapor and HCl gases absorbed at (M), and a mixture of basic and neutral aluminum sulphates.

The fraction of basic and neutral aluminum sulphates was introduced into (O) where the product was calcinated at 1050° C. to provide 1,000 kg of pure alumina and 2,019 kg of a gaseous fraction G16 consisting of a mixture of $SO_2$, $SO_3$ and water vapor. The gaseous fraction G16 was passed to (P) where regeneration of $H_2SO_4$ took place.

As previously stated, the liquor L10 weighed 13,562 kg to which was added the liquor L24 weighing 9,646 kg. The mixture of the liquors L10 and L24 was introduced into (I) where it was degassed to provide gaseous fractions G13 (500 kg) and G14 (446 kg) and a liquor L18 having a mass of 22,262 kg and the following composition by weight:

| | |
|---|---|
| $Al_2O_3$ | 0.82% |
| $Fe_2O_3$ | 0.09% |
| $TiO_2$ | 0.02% |
| $Na_2O$ | 1.04% |
| $K_2O$ | 0.76% |
| $MgO$ | 0.71% |
| $P_2O_5$ | 0.19% |
| $V_2O_5$ | 0.07% |
| $H_2SO_4$ free | 48.98% |
| $H_2SO_4$ total | 55.78% |
| $H_2O$ | 40.52% |

The liquor L18 was then passed to (J) where concentration was carried out by evaporating off 1,208 kg of water.

The liquor L19, issuing from (J), was directly recycled through the line L20 to the attack (A) and through the line L22 for the rinsing of inert substances and sulphates of impurities at (D).

The alumina obtained in this way was of high priority. Its analysis showed that the rare impurities present were of a quantity less than those usually encountered in aluminas obtained by the known industrial processes.

Fe<200 p.p.m.
Si<150 p.p.m.
Ti<25 p.p.m.
Na<850 p.p.m.
Ca<70 p.p.m.

We claim:

1. A method of obtaining alumina of high purity from aluminous mineral containing iron and titanium values as impurities by
   (a₁) attacking the mineral with a sulphuric acid liquor,
   (a₂) separating the resulting liquor from a residue which remains after the attack,
   (a) mixing the resulting liquor from step (a₂) with an HCl and $H_2SO_4$ liquor,
   (b) introducing HCl gas into the mixture of step (a),
   (c) cooling the mixture from step (b) to precipitate hydrated aluminum chlorosulphate crystals having the formula $AlSO_4Cl.6-7H_2O$,
   (d) separating the crystals of hydrated aluminum chlorosulphate from the liquor,
   (e) heating the crystals separated in step (d) to a temperature within the range of 300° C. to a temperature that does not exceed 600° C. to yield a mixture of aluminum sulphates and hydrochloric gases,
   (f) thermally decomposing the aluminum sulphates from step (e) to yield alumina of high purity and sulphuric gases $SO_2$ and $SO_3$,
   (g) degassing the liquor of step (d) to yield HCl gas,
   (h) concentrating the degassed liquor from step (g), and
   (j) recycling the concentrated liquor from step (h) to the attack on the aluminous mineral.

2. The method as claimed in claim 1 in which the mixture in step (a) is carried out at a temperature within the range of 80°–90° C.

3. The method as claimed in claim 1 in which the thermal decomposition of the aluminum sulphates in step (f) is carried out at a temperature of about 1050° C.

4. The method as claimed in claim 1 in which the HCl degassed from the mother liquor in step (g) is recycled to prepare the hydrated aluminum chlorosulphate in step (c).

5. The method as claimed in claim 1 in which the HCl from step (e) and residual HCl produced from step (g) are condensed for recycling.

6. The method as claimed in claim 1 which includes the steps of rinsing the separated crystals of hydrated aluminum chlorosulphate and recycling the resulting liquor as liquor containing HCl and $H_2SO_4$ for mixture with the resulting liquor in step (a).

7. The method as claimed in claim 1 in which the aluminous mineral is a mineral selected from the group consisting of silico-aluminum materials, siliceous bauxites, kaolinin clays, shales which may contain coal, impure aluminas, and impure aluminum sulphates from a primary process.

8. The method as claimed in claim 1 in which the impurities include compounds of iron, titanium, alkali and alkaline earth metals.

9. The method as claimed in claim 1 in which the HCl and $H_2SO_4$ liquor mixed in step (a) with the resulting liquor from step (a₂) contains 10.0 to 30.0 percent by weight of HCl and 30.0 to 0.5 percent by weight of $H_2SO_4$.

10. The method as claimed in claim 9 in which the liquor contains 10.0 to 23.0 percent by weight HCl and 30.0 to 20.0 percent by weight of $H_2SO_4$.

11. The method as claimed in claim 1 which includes the step of freeing the concentrated liquor from step (h) from impurities by the addition of concentrated $H_2SO_4$ to precipitate insoluble sulphates of impurities and separating the precipitates prior to recycle of the liquor.

12. The method as claimed in claim 1 which includes the step of washing the residue of step (a₂) with a sulphuric acid liquor to extract liquor entrained by the residue.

13. The method as claimed in claim 12 which includes the step of treating the washed residue with a dilute sulphuric acid.

14. The method as claimed in claim 1 which includes the step of washing the separated crystals of hydrated aluminum chlorosulphate from step (d) with an HCl solution prior to step (e).

15. The method as claimed in claim 1 which includes the step of mixing the liquor resulting from the separation in step (d) with concentrated sulphuric acid to precipitate sulphates of the impurities.

16. The method as claimed in claim 15 which includes the step of separating the precipitating sulphates of the impurities from the H₂SO₄ treated solution to provide the liquor which is concentrated in step (h).

17. The method as claimed in claim 16 which includes the step of thermally decomposing the sulphate of the impurities from claim 15 to yield the corresponding oxides.

* * * * *